(12) United States Patent
Theobald (10) Patent No.: US 9,466,046 B1
(45) Date of Patent: Oct. 11, 2016

(54) INVENTORYING ITEM(S) WITHIN AN ENVIRONMENT

(71) Applicant: Vecna Technologies, Inc., Cambridge, MA (US)

(72) Inventor: Daniel Theobald, Sommerville, MA (US)

(*) Notice: Subject to any disclaimer, the term of this patent is extended or adjusted under 35 U.S.C. 154(b) by 122 days.

(21) Appl. No.: 14/210,574

(22) Filed: Mar. 14, 2014

(51) Int. Cl.
| | | |
|---|---|---|
| *G06F 7/00* | (2006.01) | |
| *G06Q 10/08* | (2012.01) | |
| *B65G 1/04* | (2006.01) | |

(52) U.S. Cl.
CPC ........... *G06Q 10/087* (2013.01); *B65G 1/0492* (2013.01)

(58) Field of Classification Search
CPC .............. B65G 1/1378; B65G 1/1373; B65G 47/5104; B65G 2209/08
See application file for complete search history.

(56) References Cited

U.S. PATENT DOCUMENTS

| | | | | |
|---|---|---|---|---|
| 2004/0093116 A1* | 5/2004 | Mountz | ............... | G05D 1/0274 700/216 |
| 2006/0206235 A1* | 9/2006 | Shakes | ................. | B65G 1/1373 700/216 |
| 2009/0021351 A1* | 1/2009 | Beniyama | .............. | G05D 1/024 340/10.1 |
| 2013/0317642 A1* | 11/2013 | Asaria | .................... | G06Q 50/28 700/216 |
| 2015/0032252 A1* | 1/2015 | Galluzzo | ................. | B25J 5/007 700/218 |

* cited by examiner

*Primary Examiner* — Yolanda Cumbess
(74) *Attorney, Agent, or Firm* — Albert J. Brunett (57) ABSTRACT

Systems and apparatuses (e.g., mobile robots) including sensor systems, and methods involving sensor systems are provided. In one method, a region of an environment is surveyed using a sensor system to provide survey data. This survey data may be indicative of one or more items located within the surveyed region of the environment. One of more of the items located within the surveyed region may be inventoried based on the survey data.

3 Claims, 6 Drawing Sheets

INVENTORYING ITEM(S) WITHIN AN ENVIRONMENT

BACKGROUND OF THE INVENTION

1. Technical Field

The present invention relates generally to inventorying items within an operating environment such as a warehouse.

2. Background Information

Various methods are known in the art for inventorying items within a warehouse. For example, items may be counted when received at or stored within the warehouse. Items may also be counted when retrieved from or shipped out of the warehouse. The quantity of outgoing items may be subtracted from the quantity of incoming items to determine the item inventory for the warehouse. Such an inventorying method, however, cannot account for mistakenly uncounted incoming and/or outgoing items. Such an inventorying method also cannot account for items that are misplaced within the warehouse and, thus, cannot be found for retrieval.

Inventorying errors caused by miscounted and/or misplaced items may be manually reconciled by warehouse workers. The warehouse workers, for example, may go shelf-by-shelf and item-by-item through the warehouse to count each of the items. The warehouse workers may also re-locate any misplaced items that are found during the item-by-item accounting. Such a reconciling method, however, can be time consuming and expensive.

There is a need in the art for improved systems and methods for inventorying items within an operating environment such as a warehouse.

SUMMARY OF THE DISCLOSURE

Systems and apparatuses (e.g., mobile robots) including sensor systems, and methods involving sensor systems are provided. In one method, a region of an environment is surveyed using a sensor system to provide survey data. This survey data may be indicative of one or more items located within the surveyed region of the environment. One of more of the items located within the surveyed region may be inventoried based on the survey data.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
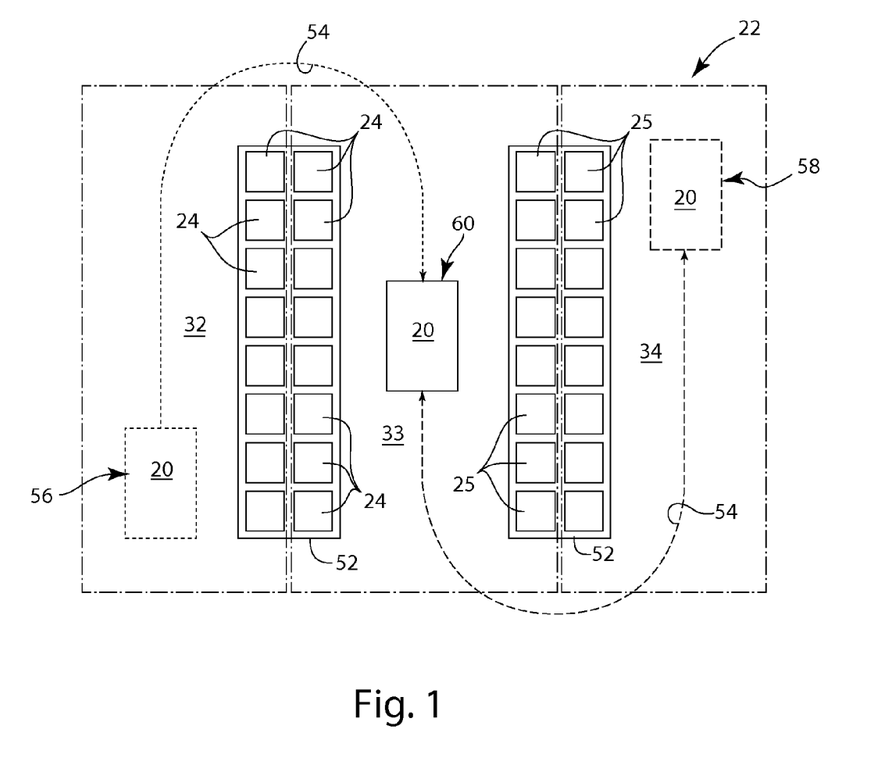
FIG. 1 is a block diagram of a mobile robot operating within an environment.

FIG. 1 illustrates a mobile robot 20 operating within an environment 22 (e.g., a warehouse) in which a plurality of items 24-25 are located. The mobile robot 20 may be configured as an autonomous mobile robot, which performs one or more tasks without continuous outside control and/or intervention. The mobile robot 20, for example, may receive instructions to perform a certain task such as inventorying one or more of the items 24-25 within the operating environment 22. The mobile robot 20 may subsequently determine and perform the operation(s) necessary to complete the task based on, for example, its current location, surrounding obstacles, operating environment layout, type of task to be performed, etc. The mobile robot 20 may also adapt to unknown, new and/or changing operating environment characteristics (e.g., layout, terrain, obstacles and other features) without additional outside control and/or intervention.

The mobile robot 20 may be fully autonomous during performance of one or more tasks. The mobile robot 20 may be semi-autonomous during performance of one or more tasks. The mobile robot 20 may also or alternatively be controlled by an individual (e.g., a human operator) during performance of one or more tasks.

The term "fully autonomous" may describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The term "semi-autonomous" may describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be performed, identify an unknown obstacle, control the scope of the task, control when the task should be performed, etc.

Figure 2:
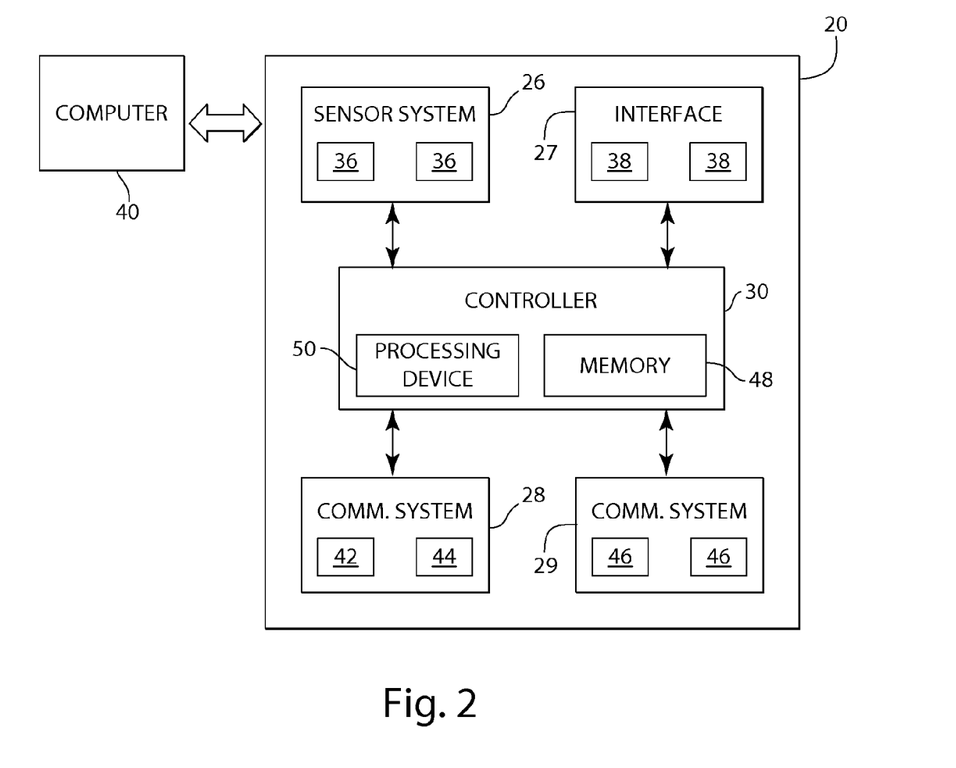
FIG. 2 is a block diagram of a remote device and components included with a mobile robot.

Referring to FIG. 2, the mobile robot 20 includes a sensor system 26, a user interface 27, a communication system 28 and a drive system 29. The mobile robot 20 also includes a controller 30, which is in signal communication (e.g., hardwired and/or wirelessly coupled) with one or more of the mobile robot components 26-29. It is worth noting, while the foregoing mobile robot components 26-30 are depicted as discrete from one another, some or all of these components 26-30 may alternatively share one or more sub-components and/or be configured as a single unit.

Referring to FIGS. 1 and 2, the sensor system 26 is adapted to survey one or more regions (e.g., regions 32-34) of the operating environment 22 that surround the mobile robot 20. The sensor system 26, for example, may scan a certain region (e.g., the region 33) of a storage facility to provide data for locating and/or identifying one or more objects and/or other features within that storage facility region. Examples of an object include, but are not limited to, an item (e.g., item 24, 25), another mobile robot, an individual, an animal, a wall, a threshold, a step, a door, a storage unit, or any other type of obstruction or landmark.

The sensor system 26 may also be adapted to receive location data. This location data may be indicative of a location of the mobile robot 20 within the operating environment 22. The location data may also or alternatively be indicative of location(s) of one or more objects and/or other features within the operating environment 22.

Referring to FIG. 2, the sensor system 26 includes one or more sensors 36. One or more of these sensors 36 may be configured as locator sensors. One or more of the sensors 36, for example, may be adapted to spatially locate (e.g., triangulate) the mobile robot 20 relative to, for example, its surrounding environment, its geographic location, and/or one or more locators (e.g., RF tags, physical landmarks, etc.). Examples of a locator sensor include, but are not limited to, a proximity sensor, a global positioning system (GPS) receiver, an RF tag reader, a radar system, an infrared system, a laser system, a radio transceiver, and a visual location system with at least one camera.

One or more of the sensors 36 may also or alternatively be configured as an identification sensor. One or more of the sensors 36, for example, may be adapted to visually or otherwise identify one or more objects and/or other features within the operating environment 22 based on one or more physical characteristics and/or data obtained from one or more identification features (e.g., RFID tags, barcodes, etc.). Examples of an identification sensor include, but are not limited to, a radar system, an infrared system, a laser system, a radio transceiver, a scanner, and a visual location system with at least one camera. The sensor system 26, of course, may also or alternatively include one or more sensors other than those described above.

The user interface 27 is adapted to present information to and receive information from one or more individuals (e.g., human operators). The user interface 27, for example, may visually, audibly and/or tactilely present the information to an individual. The user interface 27 may also visually, audibly and/or tactilely receive the information from the individual.

The user interface 27 includes one or more information input and/or output (I/O) devices 38. Examples of an information input device include, but are not limited to, a still or video camera, a scanner, a microphone, a keyboard, a keypad and a touch screen. Examples of an information output device include, but are not limited to, a display screen, a touch screen, a printer, a loudspeaker and a Braille display. The user interface 27, of course, may also or alternatively include one or more I/O devices other than those described above.

The communication system 28 is adapted to receive data from at least one remote device 40 such as, for example, a computer or another mobile robot. Examples of a computer include, but are not limited to, a kiosk, a personal computer (e.g., a desktop or laptop computer), a tablet computer, a mobile telephone (e.g., a smart phone), a personal digital assistant (PDA), and a central (e.g., base or master) computer system. The communication system 28 is also adapted to send (e.g., transmit) data to at least one remote device 40 such as the computer or other mobile robot.

The communication system 28 includes a receiver 42 and a transmitter 44. The receiver 42 may be adapted to receive data over a cellular, satellite and/or radio network. The transmitter 44 may be adapted to send data over the cellular, satellite and/or radio network. The receiver 42 and/or the transmitter 44, of course, may also or alternatively be adapted to respectively receive and/or send the data over one or more wireless networks other than those described above. In addition, in some embodiments, the receiver 42 and/or the transmitter 44 may be adapted to connect to a wired network where, for example, the mobile robot 20 is docked at a docking station.

The drive system 29 includes one or more components 46 adapted to move the mobile robot 20 within its operating environment 22 (see FIG. 1). One or more of the drive system components 46, for example, may be configured into a propulsion system for selectively driving or otherwise propelling the mobile robot 20 within its operating environment 22. An example of a propulsion system is a vehicle drivetrain with one or more drive wheels. Another example of a propulsion system is a track system with one or more continuous tracks, which may also be referred to as "tank tracks" or "caterpillar tracks". The drive system 29, however, is not limited to including any particular propulsion system types or configurations.

One or more of the drive system components 46 may also or alternatively be configured into a steering system for selectively changing a trajectory of the mobile robot 20 within its operating environment 22. An example of a steering system is a gearbox that changes a steering angle of one or more wheels. Another example of a steering system is a propulsion system speed control. Such a speed control may change the rotational speed of a drive wheel or continuous track relative to another drive wheel or continuous track in order to change the trajectory of the mobile robot 20. The drive system 29, however, is not limited to including any particular steering system types or configurations.

The controller 30 may be implemented with a combination of hardware and software. The hardware may include memory 48 and at least one processing device 50, which may include one or more single-core and/or multi-core processors. The hardware may also or alternatively include analog and/or digital circuitry other than that described above.

The memory 48 is configured to store software (e.g., program instructions) for execution by the processing device 50, which software execution may control and/or facilitate performance of one or more operations such as those described in the methods below. The memory 48 may be a non-transitory computer readable medium. For example, the memory 48 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
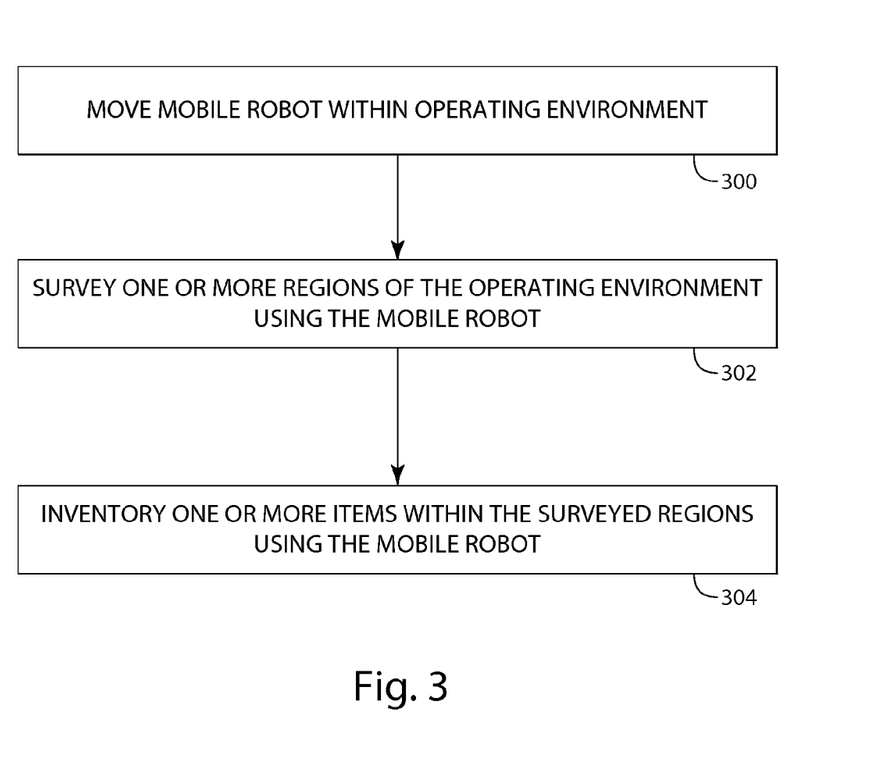
FIG. 3 is a flow diagram of a method for operating a mobile robot within an environment in which one or more items are located.

FIG. 3 is a flow diagram of a method for operating the mobile robot 20 within an environment such as the operating environment 22 illustrated in FIG. 1. This operating environment 22 may include space at (e.g., in, adjacent or proximate) a warehouse of an order fulfillment center. The term "order fulfillment center" may describe a business at which items are removed from an inventory and shipped to remote sites to fulfill orders for items placed by consumers, businesses and/or government agencies. The operating environment 22, of course, may also or alternatively include space at a warehouse or other types of temporary and/or long-term item storage rooms or facilities other than those of an order fulfillment center. The mobile robot 20, for example, may operate at a warehouse or an item storage room of a government agency, a hospital, a manufacturer, a store, etc.

The operating environment 22 may include one or more item storage units 52. Examples of a storage unit include, but are not limited to, a stack of one or more shelves, a cabinet, a unit of one or more drawers, a table, a bin, etc. Each of these storage units 52 may hold or otherwise support one or more of the items 24-25 that are located (e.g., stored) within the operating environment 22. The storage units 52 may be arranged into one or more aisles; e.g., substantially parallel aisles of storage shelves.

The items 24-25 stored and/or otherwise located within the operating environment 22 may be configured as containers and/or packaging devices. Examples of a container include, but are not limited to, a box, a lockbox, a crate, a canister, a bin, a pressure vessel, a tank, a trunk, a suitcase, a vial and a pill bottle. Examples of a packaging device include, but are not limited to, a pallet, a rack, a sack, a bag and a tube.

The containers and/or the packaging devices may be empty. Alternatively, one or more of the containers and/or the packaging devices may each be at least partially filled or loaded with one or more other items; i.e., the contents of the item 24, 25. These contents may include various types of government, business and/or personal articles (e.g., commodities). Alternatively, one or more of the items 24-25 may itself be configured as or otherwise include one or more of the government, business and/or personal articles. The present invention, however, is not limited to the exemplary items types or configurations described above.

Referring to FIGS. 1-3, in step 300, the mobile robot 20 moves within the operating environment 22. The controller 30, for example, may signal the drive system 29 to autonomously move the mobile robot 20 along a path 54 from a first location 56 to a second location 58. The sensor system 26 may be used to locate the first location 56 and/or the second location 58. The sensor system 26 may also or alternatively be used for determining the specific path 54 through the operating environment 22 such that the mobile robot 20 may avoid other objects within the operating environment 22. The sensor system 26, for example, may provide sensor data to the controller 30 indicative of current coordinates of the mobile robot 20, coordinates of the second location 58 as well as coordinates and/or headings of other objects within the operating environment 22. The controller 30 may process the sensor data, and signal the drive system 29 to move the mobile robot 20 based on the processed sensor data. The controller 30 may also or alternatively signal the drive system 29 to move the mobile robot 20 based on other data and/or signals; e.g., a remote control signal received from the remote device 40 for non-autonomous movement.

In step 302, the mobile robot 20 surveys a region 33 (or regions 32-34) within the operating environment 22. This operating environment region 33 (or regions) may be at least partially surveyed while the mobile robot 20 is moving along the path 54. The region 33 (or regions) may be at least partially surveyed while the mobile robot 20 is stopped at one or more locations (e.g., locations 56, 58 and/or 60) along the path 40. The region 33 (or regions) may also or alternatively be at least partially surveyed before, during and/or after performance of another task (or tasks) as described below in further detail.

The operating environment region 33 (or regions) is surveyed using the sensor system 26 and the controller 30. The controller 30, for example, may signal the sensor system 26 to scan the region 33 of the operating environment 22 using one or more of the sensors 36.

The term "scan" may describe a process of mapping at least a portion of one or more surfaces within an operating environment; e.g., a surface of the item 24, 25. The sensors 36, for example, may determine and/or observe one or more surface characteristics at one or more points on the mapped surface(s). An example of a surface characteristic is a spatial location of a surface (or points on a surface) relative to the mobile robot 20 or at least one reference within the operating environment 22. Other examples of a surface characteristic include, but are not limited to, color, texture or other material properties of a surface (or points on a surface).

The sensor system 26 may perform the mapping using one or more optical scanning processes such as, but not limited to, laser scanning and image capture. The sensor system 26 may also or alternatively perform the mapping using one or more audio scanning processes such as, but not limited to, radar scanning, Doppler scanning and ultrasound scanning. The present method, however, is not limited to the foregoing exemplary mapping processes.

The term "scan" may also or alternatively describe a process for receiving and/or reading data from a device or feature configured with an object (e.g., the item 24, 25) within the operating environment region 33 (or regions). The sensor system 26, for example, may receive identification data from an identification feature (e.g., an RFID tag) attached to one of the items 24, 25. The sensor system 26 may receive location data from a locator (e.g., a GPS device) attached to one of the items 24, 25. The sensor system 26 may also or alternatively obtain (e.g., read) identification and/or location data from a label on the items 24, 25. Examples of a label include, but are not limited to, a barcode, a quick response (QR) code, a trademark image, an image of an object's contents, and a typographical message; e.g., a description of contents and/or an address.

The sensor system 26 provides sensor data to the controller 30. This sensor data is indicative of one or more of the determined and/or observed characteristics of the mapped surface(s). The sensor data may also or alternatively be indicative of the received and/or read data; e.g., location data, identification data, etc. The sensor system 26, for example, may photograph the operating environment region 33, and provide sensor data indicative of the photographed region to the controller 30.

The controller 30 processes the received sensor data to determine one or more characteristics of the scanned region 33 and provide survey data indicative thereof. The controller 30, for example, may determine whether or not one or more of the items 24-25 are located within the scanned region 33 by, for example, comparing the received sensor data to reference data and/or previously received sensor data. The controller 30 may determine the spatial location and/or orientation of the item(s) 24, 25 located within the scanned region 33 by, for example, processing the received sensor data with reference data indicative of, for example, a coordinate system. The controller 30 may identify (e.g., a type and/or contents of) one or more of the items 24-25 within the scanned region 33 by, for example, processing the received sensor data with feature (e.g., image) recognition software. The controller 30 may also or alternatively identify (e.g., a type and/or contents of) one or more of the items 24-25 within the scanned region 33 by, for example, processing the received sensor data with label (e.g., barcode and text) recognition and/or reading software. The controller 30, of course, may also or alternatively determine information other than that described above.

In step 304, the mobile robot 20 inventories one or more of the items 24-25 within the surveyed region 33 (or regions 32-34). The term "inventorying" may describe a process for determining and/or collecting information relating to one or more items within an operating environment. The controller 30, for example, may process the survey data to determine, estimate, predict and/or map some or all of the following information:

A quantity of items 24-25 within one or more surveyed regions;

A quantity of items 24-25 within the operating environment;

A quantity of items 24, 25 of one or more types within one or more surveyed regions;

A quantity of items 24, 25 of one or more types within the operating environment;

Locations of items 24-25 within one or more surveyed regions;

Locations of items 24-25 within the operating environment;

Locations of items 24, 25 of one or more types within one or more surveyed regions; and Locations of items 24, 25 of one or more types within the operating environment.

The controller 30, of course, may also or alternatively determine, estimate, predict and/or map information relating to an inventory of items other than that described above.

Inventory data indicative of the foregoing inventory information may be saved within the memory 48 for later retrieval and use. The inventory data may also or alternatively be communicated to the remote device 40 for processing and/or later retrieval and use. For example, the mobile robot 20 may inventory the items 24-25 within the operating environment 22 at least while the storage units 52 are being stocked with the items 24-25. During an order fulfillment task, however, the mobile robot 20 and/or the remote device 40 may access and process the inventory data to, for example, locate where one of the items 24, 25 is disposed such that it may be retrieved for packaging and shipment. In this manner, the method of FIG. 3 may account for misplaced items. In another example, the inventory data may be processed for yearend inventorying and/or other one time and/or periodic accounting tasks. In still another example, the remote device 40 may compile and/or otherwise process the inventory data with previously received inventory data and/or inventory data from another device (e.g., another mobile robot or sensor system) to generate a master (e.g., total) inventory. Alternatively, the mobile robot 20 may receive inventory data from the remote device and may compile this received inventory data with its inventory data to generate the master inventory.

In some embodiments, the method of FIG. 3 may be performed without the mobile robot 20. For example, the sensor system 26 and the controller 30 may be configured as a standalone monitoring system. The sensors 36 may be (e.g., fixedly) mounted at one or more locations (e.g., locations 56, 58 and 60) within the operating environment 22. These locations may be selected such that one or more particular regions (e.g., regions 32-34) and/or the entire operating environment 22 may be scanned. Such a monitoring system may also be configured with or as a security system; e.g., the sensors 36 may also be configured as security cameras, motion detectors, etc.

Figure 4:
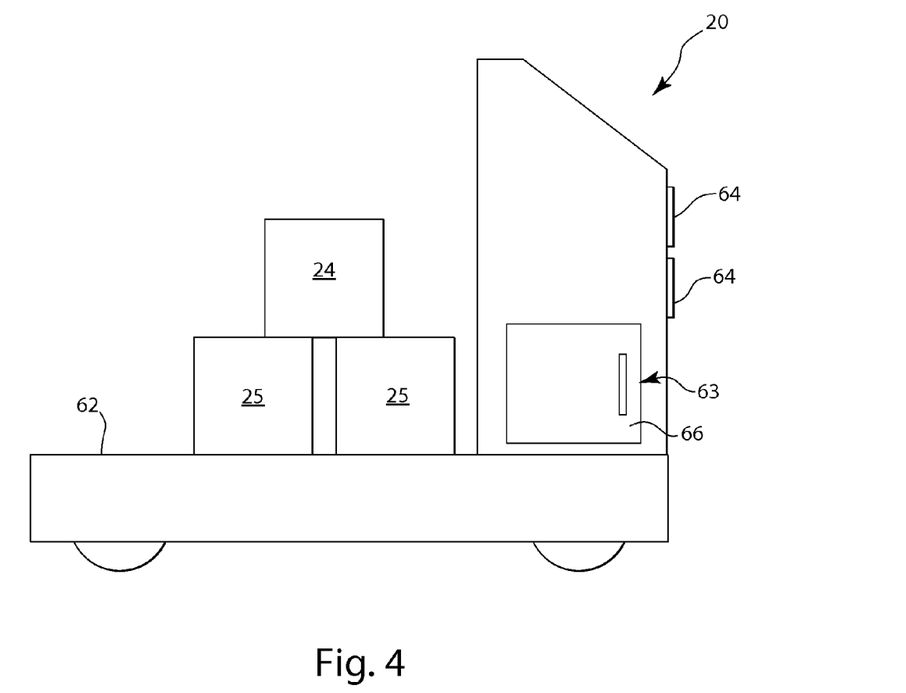
FIGS. 4-6 are illustrations of exemplary embodiments of a mobile robot.
Figure 5:
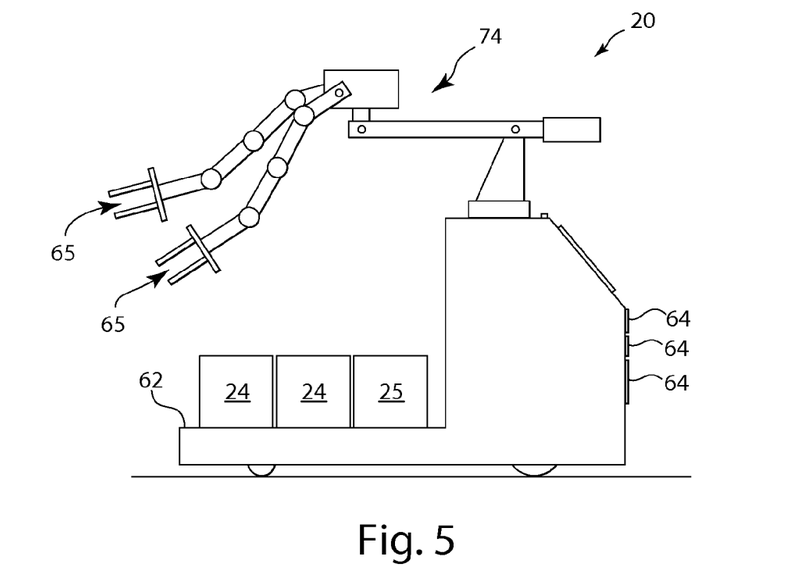
Figure 6:
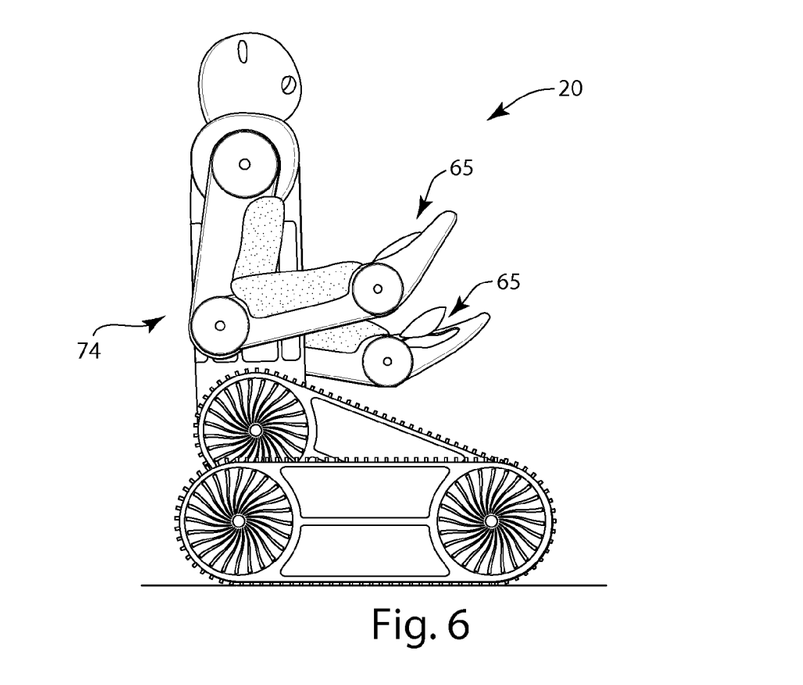

FIGS. 4-6 illustrate exemplary embodiments of the mobile robot 20. These mobile robot 20 embodiments may each include one or more item supports 62-65. Each of these item supports 62-65 is adapted to hold, contain and/or otherwise support one or more of the items 24-25. For example, referring to FIG. 4, the item support 62 is configured as a platform such as, for example, a deck or a bed. This platform 62 may have a single support surface. Alternatively, the platform 62 may include at least one divider that defines a plurality of support surfaces and/or sub-supports (e.g., bins). The item support 63 may be configured as a shelf within (or a base of) a cabinet interior (e.g., a cubby), which may be opened and closed using at least one cabinet door 66. The item supports 64 are configured as drawers; e.g., lockable cabinet drawers. Referring to FIGS. 5 and 6, the item supports 65 are configured as manipulators which can grasp or otherwise hold one or more items 24-25. The mobile robot 20, of course, is not limited to including any particular item support types or configurations.

Figure 7:
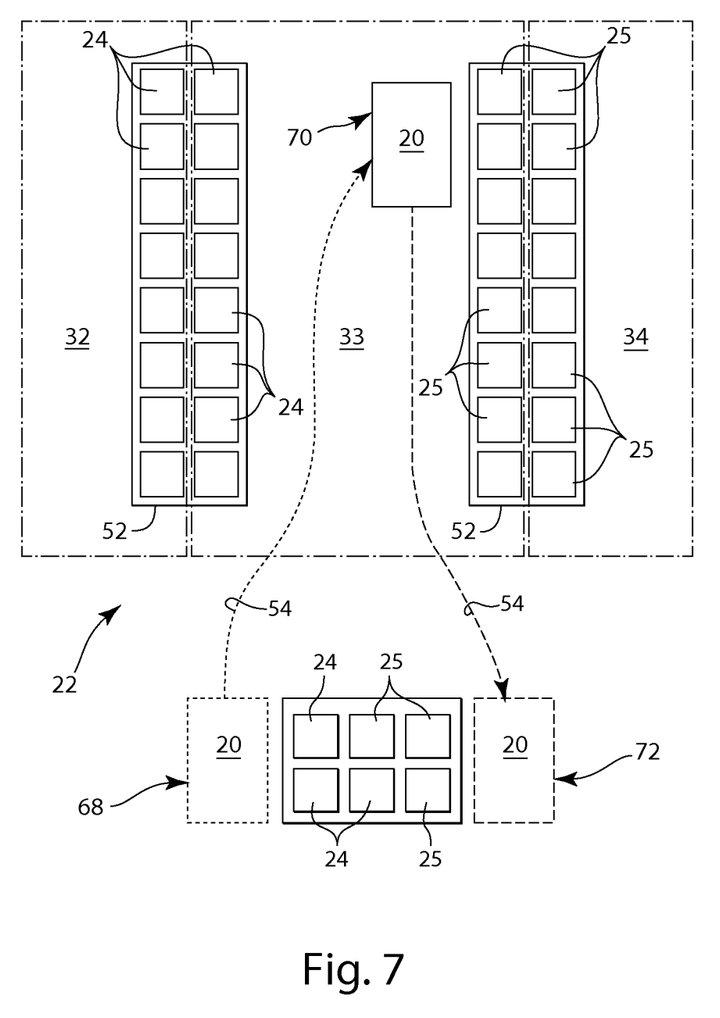
FIG. 7 is another block diagram of a mobile robot operating within an environment.

Referring to FIGS. 4 and 7, the mobile robot 20 may utilize one or more of its item supports (e.g., the platform 62) to transport one or more of the items 24-25 from at least one item pick location 68 to at least one item drop off location 70. For example, a first individual may (e.g., manually) load one or more items 24-25 with the mobile robot 20 at the pickup location 68. The loaded mobile robot 20 may autonomously move from the pickup location 68 to the drop off location 70 in a similar manner as described above with respect to the step 300. A second individual may (e.g., manually) unload one or more of the items 24-25 from the mobile robot 20 at the drop off location 70. The second individual may subsequently place the items 24-25 onto one or more of the item storage units 52 to stock the operating environment 22; e.g., warehouse. The second individual (or another individual) may also or alternatively (e.g., manually) load one or more stocked items 24-25 with the mobile robot 20 at the location 70 for delivery to another item drop off location 72; e.g., a packaging and/or shipping station.

Referring to FIGS. 5 and 6, the mobile robot 20 may also include a manipulator system 74 in signal communication with the controller 30. This manipulator system 74 may include one or more manipulators (e.g., the manipulators 65). One or more of these manipulators 65 may be adapted to move, or assist with the movement of, one or more of the items 24-25 onto or into one or more of the item supports 62-64. One or more of the manipulators 65 may also or alternatively be adapted to move, or assist with the movement of, one or more of the items 24-25 off of or out of one or more of the item supports 62-64. For example, in the embodiments of FIGS. 5 and 6, each of the manipulators 65 is configured as a robotic manipulator arm with at least one end effector; e.g., a gripping device such as a robotic hand. The manipulator system 74, however, may also or alternatively include one or more manipulators than those described above and illustrated in the drawings. For example, in some embodiments, the manipulator system 74 may include one or more actuators adapted to open and/or close one or more of drawers and/or cabinet doors.

Referring to FIGS. 5-7, the mobile robot 20 may utilize one or more of its manipulators 65 to gather one or more of the items 24-25 at the pickup location 68. For example, the manipulators 65 may pick up and load the items 24-25 onto the item support 62. The mobile robot 20 may also or alternatively utilize one or more of its manipulators 65 to deliver one or more of the items 24-25 at one or more of the drop off locations 70 and 72. For example, the manipulators 65 may unload the items 24-25 from the item support 62 and/or stock the items 24-25 with the storage units 52. Of course, in some embodiments, both the respective individuals and the manipulator system 74 may substantially contemporaneously or serially load and/or unload the items 24-25.

It is worth noting, the surveying step 302 and/or the inventorying step 304 may each be at least partially performed during the item loading, the item transportation and/or the item unloading described above. For example, the mobile robot 20 may survey the operating environment 22 while transporting items 24-25 within the operating environment 22. The surveying step 302 and/or the inventorying step 304 may also or alternatively each be at least partially performed while the mobile robot 20 is performing one or more tasks other than those described above. Examples of such other tasks include, but are not limited to, maintenance tasks such as scheduling and/or receiving service, battery charging, fueling, etc. Additional non-limiting examples of such other tasks are disclosed in U.S. patent application Ser. No. 14/033,821 filed on Sep. 23, 2013 entitled "Transporting and/or Sorting Items with Mobile Robots", which is hereby incorporated herein by reference in its entirety.

In some embodiments, the mobile robot 20 may use, manipulate and/or otherwise control one or more other devices within the operating environment 22 during and/or between performance of its task(s). The operating environment 22, for example, may include a transportation device such as an elevator, an escalator or a moving walk. The mobile robot 20 may ride the transportation device to move between various areas (e.g., floors) within the operating environment 22. The operating environment 22 may include at least one door which the mobile robot may autonomously open and/or close. The mobile robot 20, for example, may signal an actuator connected to the door to open and/or close the door. The operating environment 22, of course, may also or alternatively include one or more devices other than those described above, which may be used, manipulated and/or otherwise controlled by the mobile robot 20 during and/or between performance of its task(s).

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method of inventorying the items in an environment via an autonomous mobile robot without any human intervention, comprising:
    providing a fully autonomous mobile robot capable of moving about and performing a variety of tasks within a desired environment;
    providing at least one sensor in cooperative engagement with the mobile robot for identifying items and their particular location within the environment as the mobile robot moves about the environment in the performance of one or more tasks;
    operating the mobile robot to perform one or more tasks within the environment as it moves about the environment; and
    utilizing the at least one sensor to autonomously determine where each particular item is located within the environment simultaneously as the mobile robot moves about the environment and performs its task to determine whether the items are in their correct position, the wrong position and are newly added to the inventory and share that location information with other mobile robots if desired.

2. The method as defined in claim 1, including adding new items to the inventory at random locations within the environment and utilizing the sensor to autonomously locate each of the new items as the mobile robot moves about the environment and performs its task.

3. The method as defined in claim 1, including providing a plurality of items at random locations within the environment, operating the mobile robot to move about the entire environment and utilizing the at least one sensor to autonomously determine where each particular item is located within the environment simultaneously as the mobile robot moves about the environment.

* * * * *